(12) United States Patent
Binek et al.

(10) Patent No.: US 12,480,658 B2
(45) Date of Patent: *Nov. 25, 2025

(54) COOLING FUEL INJECTOR SYSTEM FOR AN ATTRITABLE ENGINE

(71) Applicant: RTX Corporation, Farmington, CT (US)

(72) Inventors: Lawrence A. Binek, Glastonbury, CT (US); David W. Morganson, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/386,508

(22) Filed: Nov. 2, 2023

(65) Prior Publication Data

US 2024/0077204 A1    Mar. 7, 2024

Related U.S. Application Data

(62) Division of application No. 16/448,778, filed on Jun. 21, 2019, now abandoned.

(51) Int. Cl.
| | |
|---|---|
| *G01M 15/14* | (2006.01) |
| *F02C 7/16* | (2006.01) |
| *F23R 3/28* | (2006.01) |
| *G01F 1/00* | (2022.01) |

(52) U.S. Cl.
CPC ............. *F23R 3/283* (2013.01); *F02C 7/16* (2013.01); *G01F 1/00* (2013.01); *G01M 15/14* (2013.01)

(58) Field of Classification Search
CPC ............ G01M 15/14; F02C 7/22; F02C 7/222; F02C 9/00; F02C 9/26
USPC .......................... 73/114.48, 114.45, 114.46
See application file for complete search history.

(56) References Cited

U.S. PATENT DOCUMENTS

| | | | |
|---|---|---|---|
| 2,772,729 A | 12/1956 | Mayhew | |
| 3,874,592 A | 4/1975 | Buschmann | |
| 5,226,311 A * | 7/1993 | Scourtes | ............... G05D 7/0676 73/114.42 |
| 5,257,496 A * | 11/1993 | Brown | ..................... F23N 5/082 60/773 |
| 5,727,378 A * | 3/1998 | Seymour | ............... F01D 25/125 60/738 |
| 9,062,609 B2 | 6/2015 | Mehring | |
| 9,803,498 B2 * | 10/2017 | Jewess | ..................... F01D 15/10 |
| 11,753,994 B2 * | 9/2023 | Binek | ..................... F23R 3/286 264/308 |
| 2007/0028589 A1 | 2/2007 | Alexander | |
| 2010/0018209 A1 | 1/2010 | Ramier | |
| 2012/0132725 A1 | 5/2012 | Dinu | |

(Continued)

*Primary Examiner* — Thomas P Burke
(74) *Attorney, Agent, or Firm* — Getz Balich LLC

(57) ABSTRACT

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes at least one second cavity embedded within the engine case wall and defines at least one cooling channel that is in thermal communication through the engine case wall with the injector.

8 Claims, 3 Drawing Sheets

(56) References Cited

U.S. PATENT DOCUMENTS

| | | |
|---|---|---|
| 2015/0176432 A1 | 6/2015 | Farah |
| 2016/0201917 A1* | 7/2016 | Dautova .................. F23R 3/20 60/785 |
| 2016/0230998 A1 | 8/2016 | Frish |
| 2017/0261964 A1 | 9/2017 | Meadows |
| 2017/0268784 A1 | 9/2017 | Crawley |
| 2021/0003480 A1* | 1/2021 | Binek .................. G01M 15/14 |

* cited by examiner

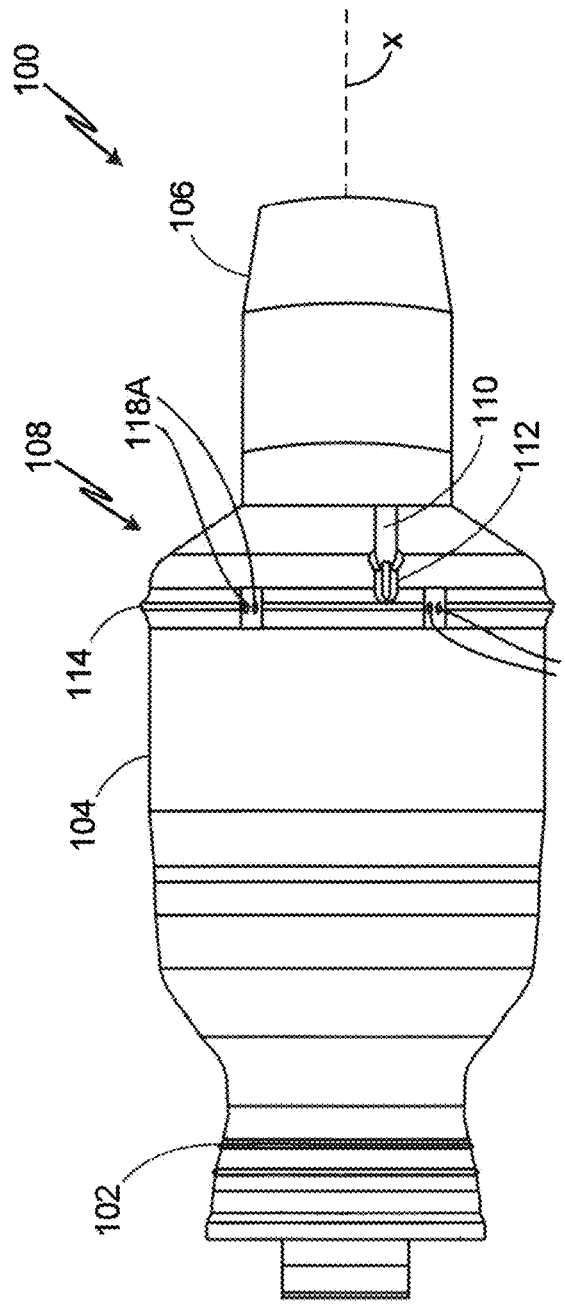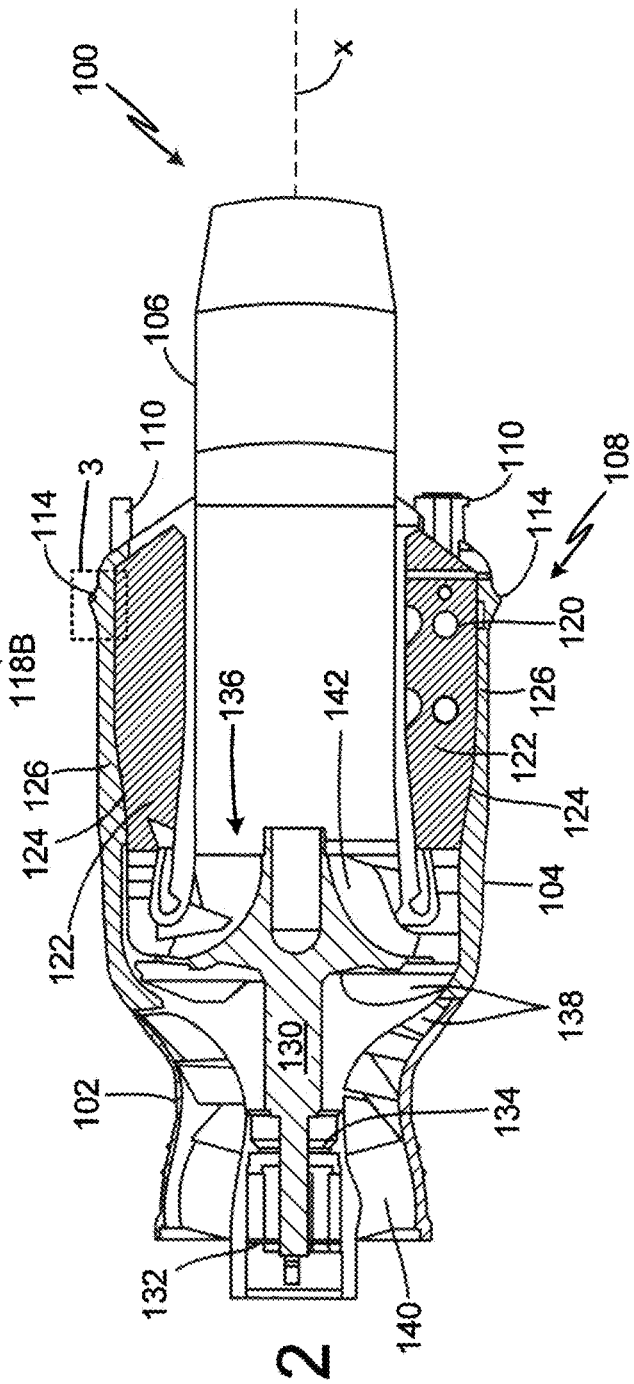

COOLING FUEL INJECTOR SYSTEM FOR AN ATTRITABLE ENGINE

This application is a divisional of U.S. patent application Ser. No. 16/448,778 filed Jun. 21, 2019, which is hereby incorporated herein by reference in its entirety.

BACKGROUND

The present disclosure relates generally to attritable aircraft engines. More specifically, this disclosure relates to cooling a fluid dispensing system within an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary, such as, a fuel dispensing system within a traditional aircraft engine, which can have more than 30 individual parts, each requiring assembly. Even in the realm of attritable engines, conventional fuel rails can have more than 10 individual parts, which need to be brazed together, which is expensive and time consuming.

Furthermore, conventional fluid dispensing devices may be heavy, are difficult to package, and because of the many operating parts may be expensive to maintain and/or repair. There exist needs in various industries to reduce the number of manufactured parts for fluid dispensing devices, thereby providing more robust and simpler designs, which requires less maintenance, reduces manufacturing time and costs, reduces weight, and simplifies packaging.

SUMMARY

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes at least one second cavity embedded within the engine case wall and defines at least one cooling channel that is in thermal communication through the engine case wall with the injector.

A method of testing a fluid dispensing system in an attritable engine includes injecting a cooling fluid into an at least one cooling hole for each of (N−1) injectors and inducing a phase change to a flow test fluid in each of (N−1) injectors, which prevents flow through each of (N−1) injectors. The method includes measuring a flow rate of the flow test fluid through a single unblocked injector.

BRIEF DESCRIPTION OF THE DRAWINGS

FIG. 1 is a side view of an attritable engine.
FIG. 2 is a cross-sectional view of the attritable engine.

DETAILED DESCRIPTION

An attritable engine with an integrally built fuel dispensing system simplifies manufacturing. Even so, an attritable engine can leverage additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

However, an integrally built fuel system in an attritable engine limits accessibility for inspection and testing post-manufacture. Typically, gas turbine engines have more than one fuel injector per engine, which complicates determining whether one or more individual injectors are clogged or otherwise faulty using routine techniques. For example, although CT scanning (Computed Tomography) can be used to inspect an attritable engine, CT scanning is very time consuming and costly. As such, CT scanning is not amenable to inspection of every manufactured attritable engine. An attritable engine with cooling holes and a method to individually isolate and flow test each injector using the cooling holes are disclosed herein.

Figure 3A:
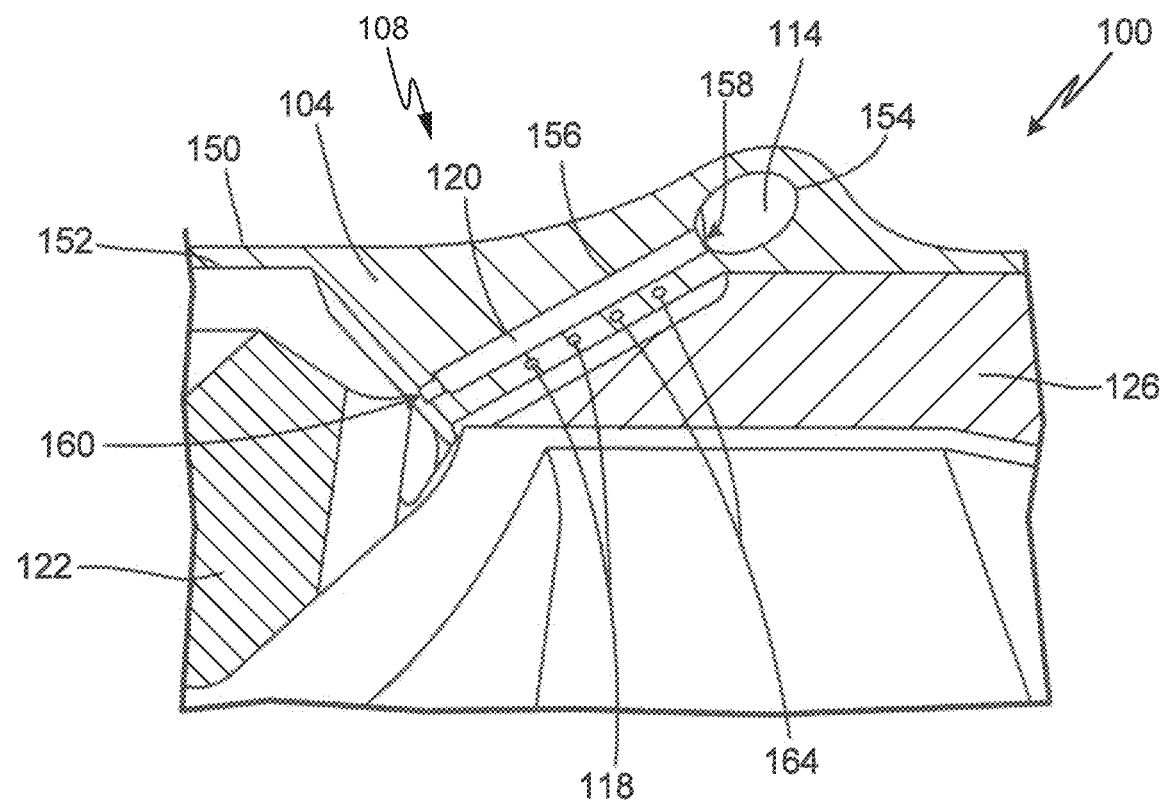
FIG. 3A is a sectional region view of an injector with cooling holes shown in region 3 of FIG. 2.

FIGS. 1 and 2 will be discussed together. FIG. 1 is a side view of an attritable engine. FIG. 1 shows attritable engine 100 including forward engine casing 102, rearward engine casing 104, exhaust casing 106, fluid distribution system 108, fuel inlet pipe 110, fuel manifold 112, fuel line 114, cooling holes 118A and 118B, and axis of rotation X. FIG. 2 is a cross-sectional view of attritable engine 100 including forward engine casing 102, rearward engine casing 104, exhaust casing 106, fluid distribution system 108, fuel inlet 110, fuel line 114, combustor 122, combustor liner 124, air channel 126, rotor 130, bearings 132 and 134, rotor system 136, compressor blades 138, air inlet 140, turbine blades 142, and axis of rotation X. FIG. 2 additionally shows a region 3 that is depicted in FIG. 3A.

Forward engine casing 102 encases a compressor section of attritable engine 100 and is connected to rearward engine casing 104, which encases combustion and turbine sections of attritable engine 100. Exhaust casing 106 is connected to rearward engine casing 104, opposing forward engine casing 102.

Rearward engine casing 104 has fluid distribution system 108 including fuel inlet 110, fuel manifold 112, fuel line 114, and cooling holes 118A and 118B. Although only two sets of cooling holes 118A and 118B are shown, four other sets of cooling holes are present and circumferentially related around axis of rotation X and obscured in FIG. 1 by rearward engine casing 104. Although only one set of cooling holes, 118A or 118B, surround each injector in FIG. 1, any number of sets of cooling holes can surround each injector that have sufficient structural integrity to withstand the pressures and temperatures in an attritable engine under load.

Fuel inlet 110 is coupled to a fuel source such as a fuel tank. Fuel inlet 110 is configured to deliver fuel to fuel manifold 112, which is connected to and delivers fuel to fuel line 114. The fuel exits fuel line 114 and enters injector 120, which delivers the fuel to combustor 122 defined by combustor wall 124. The fuel can be aerated by air from air channel 126 prior to delivery into combustor 122, aerated in combustor 122, or aerated both prior to and during delivery to combustor 122.

Combusted fuel exits combustor 122 and turns rotor 130, which is received in bearings 132 and 134. Rotor system 136 includes compressor blades 138, air inlet 140, and turbine blades 142. Air enters air inlet 140 and is compressed by compressor blades 138. Compressed air enters combustor 122 where the compressed air is combusted with fuel from injector 120. The combusted air from combustor 122 enters and turns turbine blades 142, which are attached to rotor 130, circumferentially around rotational axis X, generating power. The air exits out of exhaust casing 106.

Figure 3B:
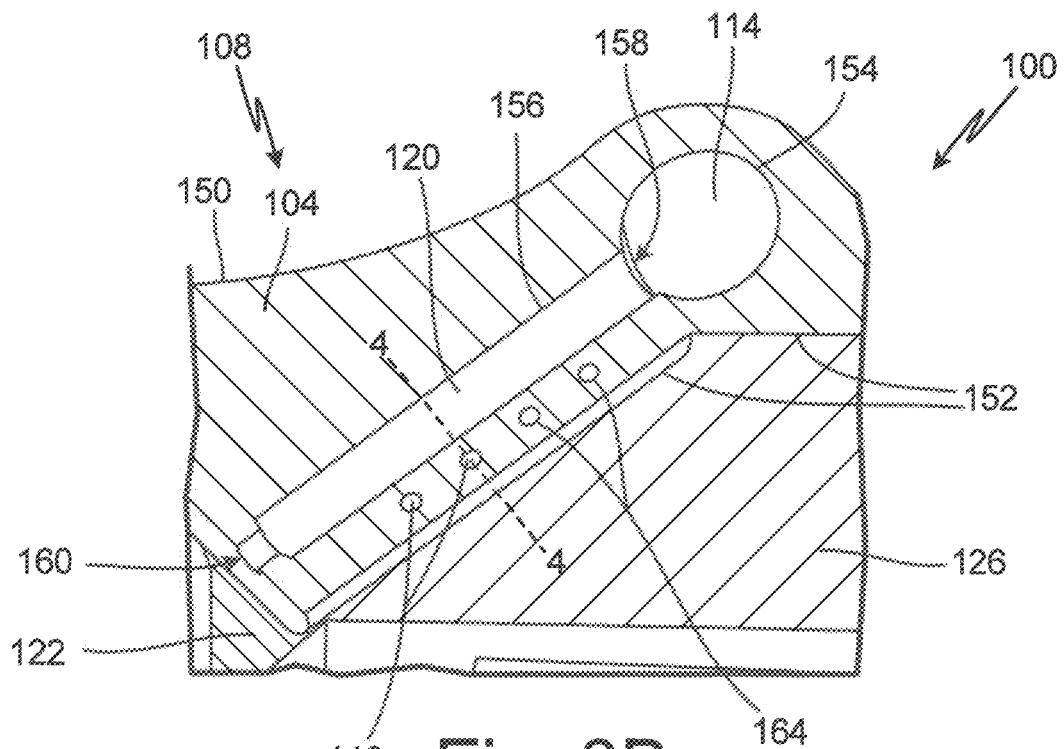
FIG. 3B is an enlarged sectional region view of an injector with cooling holes shown in FIG. 3A.
Figure 4:
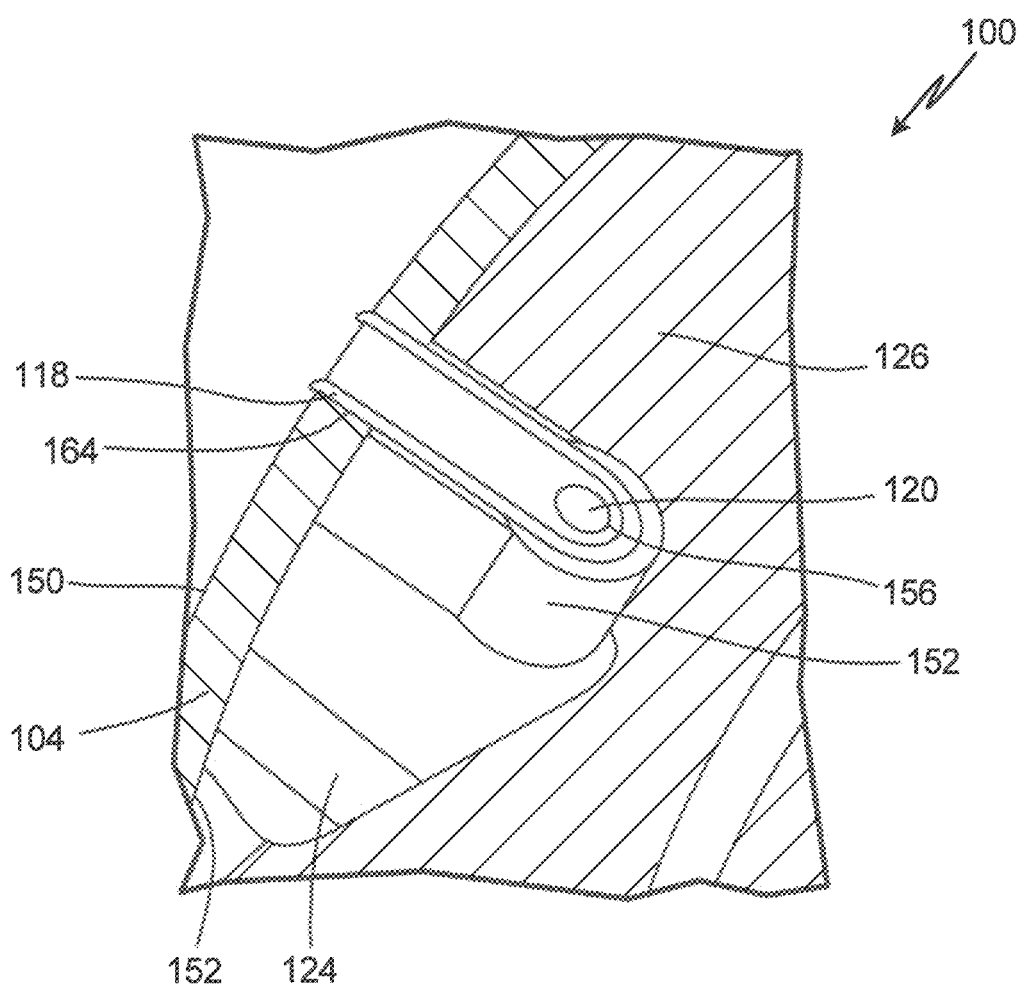
FIG. 4 is a cross-sectional view of an injector with a cooling hole shown in FIG. 3B from 4-4.

FIGS. 3A and 3B will be discussed together. FIGS. 3A and 3B are enlarged sectional views of the region 3 having-of an injector with cooling holes shown in FIG. 2. FIG. 3B is a further enlarged sectional region view of the injector with cooling holes shown in FIG. 2. FIGS. 3A and 3B show attritable engine 100 including rearward engine casing 104, fluid dispensing system 108, fuel line 114, cooling holes 118, injector 120, combustor 122, air channel 126, exterior surface 150, interior surface 152, fuel line wall 154, injector wall 156, injector inlet 158, injector outlet 160, and cooling hole walls 164. FIG. 3B additionally shows a cross-section from 4-4 that is depicted in FIG. 4.

Attritable engine 100 includes rearward engine casing 104, which has exterior surface 150 and interior surface 152. Attritable engine 100 also includes fluid dispensing system 108 manufactured integral and conformal with rearward engine casing 104. Fluid dispensing system 108 includes fuel line 114, injector 120, injector inlet 158, injector outlet 160, and cooling holes 118. Rearward engine casing 104 includes a plurality of cavities. Fuel line 114 is a cavity within rearward engine casing 104 defined by fuel line wall 154. Injector 120 is a cavity within rearward engine casing 104 and is defined by injector wall 156. Cooling holes 118 are cavities within rearward engine casing 104 and are defined by cooling hole walls 164.

Rearward engine casing 104 circumferentially surrounds rotor 130 along its rotational axis X. Injector 120 is attached to fuel line 114 at injector inlet 158. Injector 120 extends at an acute angle from rearward engine casing 104 in an axial direction toward rotational axis X of rotor 130 and away from exterior surface 150. Injector 120 is integral and conformal with rearward engine casing 104 and extends through and is defined by rearward engine casing 104.

Fluid distribution system 108 operates by fuel entering fuel line 114, which is configured to receive fuel from a fuel source such as a fuel tank and deliver fuel to injector 120 at injector inlet 158. The fuel can be partially aerated in fuel line 114. For example, fuel line 114 can have numerous holes where air from air channel 126 may enter and mix with the fuel. The fuel travels through injector 120 and exits at injector outlet 160 where the fuel is dispensed into combustor 122. Injector outlet 160 of injector 120 is configured to deliver fuel, which can be aerated, to combustor 122. The fuel entering combustor 122 can be further aerated and is combusted.

Cooling holes 118 are built integral and conformal with rearward engine casing 104. In one embodiment, cooling holes 118 extend from exterior surface 150 and through rearward engine casing 104, circumnavigating injector 120 within rearward engine casing 104, and extend back through rearward engine casing 104 returning to exterior surface 150. Cooling holes 118 are open on exterior surface 150 to allow a gas or liquid to flow through cooling holes 118. Cooling holes 118 are adjacent to injector 120.

Cooling holes 118 can be any aperture, groove, trough, or depression that is in thermal communication with injector 120. Cooling holes 118 are close enough to injector 120 to be in thermal communication with injector 120, but not close enough to substantially reduce the structural integrity of rearward engine casing 104, injector 120, or cooling holes 118 compared to an attritable engine without any cooling holes. Although attritable engine 100 is depicted in FIGS. 3A and 3B as having four cooling holes, attritable engine 100 can have any number of cooling holes which are in thermal communication with an injector and have sufficient structural integrity to withstand the pressures and temperatures in an attritable engine under load.

An attritable engine can have more than one injector per engine. After the attritable engine has been manufactured, the injectors can be flow tested to ensure the stringent flow requirements are met to operate the gas turbine engine under load. However, it is desirable to flow test each injector one at a time and, as such, desirable to temporarily block the flow of the other injectors present in the attitable engine.

The cooling hole system of attritable engine 100 temporarily blocks the flow of the other injectors in the attritable engine by freezing a flow test fluid in each of the other injectors. A flow test fluid is injected into fuel line 114 and enters injector 120. A cooling fluid is then injected into cooling holes 118. The cooling fluid can be a liquid or a gas such as, for example, water, salt water, a water-alcohol mixture, carbon dioxide gas, or nitrogen gas. As the cooling fluid travels through cooling holes 118, the cooling fluid absorbs heat from rearward engine casing 104, which in turn absorbs heat from a flow test fluid present in injector 120. The cooling fluid is cold enough to induce a phase change in the testing fluid to a solid. The solid testing fluid prevents any further flow through injector 120.

Cooling fluid is injected into the cooling holes 118 for all the injectors of attritable engine 100, except for one. For example, an attritable engine with an N number of injectors would have (N−1) sets of cooling holes injected with cooling fluid, which prevents flow through the corresponding (N−1) injectors. That leaves one injector available for flow testing. The flow rate can be measured of a test fluid such as, for example, water or fuel. The injector under test can be blocked by injecting the cooling fluid into the injector's cooling holes in order to induce a phase change in the flow test fluid present in the injector. Next, one of the (N−1) injectors can be unblocked by allowing the flow test fluid to undergo another phase change. Either a heating fluid can be injected into the cooling holes or ambient conditions can be allowed to warm up the flow test fluid by simply removing the cooling fluid from the cooling holes. Subsequently, the one of the (N−1) injectors can be flow tested. This process can be repeated until all N injectors have been fluidically isolated and flow tested.

Notably, water can be used both as the cooling fluid and the flow test fluid. For example, fast moving water, a suitable mixture of salt water, or a suitable mixture of water and alcohol do not freeze even below 0° C. (32° F.) and, as such, can induce a phase change of water in the injector.

Measured flow rates within tolerance requirements indicate a successful manufacture, whereas, measured flow rates outside of tolerance requirements may indicate the injector was not manufactured correctly. For example, a metallic powder used during an additive manufacturing process may not be sintered completely or properly removed after one or more additive manufacturing building steps and, as such, obstruct the flow path through the injector.

Alternatively, a gas, such as Argon, can be used as the flow test fluid. A gas passing through a restricted opening, such as an injector, induces an acoustic vibration. The pitch of the acoustic vibration changes as the restriction is enlarged or narrowed. Measuring the pitch of the acoustic vibration may indicate a successful build, an improper build, or a plugged injector.

FIG. 4 is a cross-sectional view of an injector with a cooling hole shown in FIG. 3B from section 4-4. FIG. 4 shows attritable engine 100 including rearward engine casing 104, cooling hole 118, injector 120, combustor wall 124, air channel 126, exterior surface 150, interior surface 152, injector wall 156, and cooling hole walls 164. Attritable engine 100 has rearward engine casing 104 with exterior surface 150 and interior surface 152. Attritable engine 100 also has injector 120 integral and conformal with rearward engine casing 104. Injector 120 is a cavity within rearward engine casing 104 defined by injector wall 156.

Attritable engine 100 has cooling hole 118, which is a cavity within rearward engine casing 104 and is defined by cooling hole wall 164. Cooling hole 118 extends from exterior surface 150 of rearward engine casing 104 and circumnavigates injector 120 and extends back to exterior surface 150 of rearward engine casing 104. Attritable engine 100 has combustor wall 124, surrounding the combustor, which is in fluid communication with injector 120. Although depicted in FIG. 4 as only having one cooling hole, attritable engine 100 can have any number of cooling holes which are in thermal communication with an injector and have sufficient structural integrity to withstand the pressures and temperatures in an attritable engine under load.

Attritable engine 100 is built using additive manufacturing techniques and has fluid dispensing system 108 manufactured integral with the engine case wall. Specifically, the engine case wall is built up in a layer-by-layer process in an axial direction toward the central rotor's rotational axis and has a plurality of cavities. The additively manufactured engine case wall results in a geometry for the injector that meets the stringent tolerance requirements of the attritable engine and includes cooling holes to allow sequential flow testing of individual injectors within the attritable engine.

Attritable engine 100 can be additively manufactured using any metal or alloy that can tolerate the high temperature and pressure environment of an aircraft combustion engine for the expected useable life of the vehicle, such as, for example, Inconel® 625 or other nickel alloys or alloys of nickel, chromium, and iron. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Providing cooling holes adjacent to and in thermal communication with the injectors of an attritable engine allows each injector to be fluidically isolated and flow tested after the attritable engine has been manufactured. This testing process is much faster and less expensive than conventional testing techniques such as CT scanning.

Discussion of Possible Embodiments

The following are non-exclusive descriptions of possible embodiments of the present invention.

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes at least one second cavity embedded within the engine case wall and defines at least one cooling channel that is in thermal communication through the engine case wall with the injector.

The engine of the preceding paragraph can optionally include, additionally and/or alternatively, any one or more of the following features, configurations and/or additional components:

The at least one cooling channel has an inlet and an outlet at an exterior surface of the engine case wall.

The at least one cooling channel tunnels through the engine case wall and circumnavigates the injector.

The injector includes an injector inlet and an injector outlet.

The engine includes a third cavity, embedded within the engine case wall, defining a fuel line, which is connected to the injector inlet and is in fluid communication with the injector.

The fuel line extends around the engine case wall circumferentially and is connected to N number of injector inlets and is in fluid communication with N number of injectors.

The combustor section is connected to the injector outlet.

The engine case is formed of a nickel alloy.

A method of testing a fluid dispensing system in an attritable engine includes injecting a cooling fluid into an at least one cooling hole for each of (N−1) injectors and inducing a phase change to a flow test fluid in each of (N−1) injectors, which prevents flow through each of (N−1) injectors. The method includes measuring a flow rate of the flow test fluid through a single unblocked injector.

The method of the preceding paragraph can optionally include, additionally and/or alternatively, any one or more of the following features, configurations and/or additional components:

The method includes injecting a cooling fluid into the single unblocked injector and inducing a phase change to a flow test fluid in the single unblocked injector, which prevents flow through the single unblocked injector. The method includes inducing a phase change to a flow test fluid in one of the (N−1) injectors, which allows flow through one of the (N−1) injectors, and measuring a flow rate of the flow test fluid through one of the (N−1) injectors.

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes at least one second cavity embedded within the engine case wall and defines at least one cooling channel that is in thermal communication through the engine case wall with the injector. The at least one cooling channel includes an inlet and an outlet at an exterior surface of the engine case wall and tunnels through the engine case wall, circumnavigating the injector.

The engine of the preceding paragraph can optionally include, additionally and/or alternatively, any one or more of the following features, configurations and/or additional components:

The injector includes an injector inlet and an injector outlet.

The engine includes a third cavity, embedded within the engine case wall, defining a fuel line, which is connected to the injector inlet and is in fluid communication with the injector.

The fuel line extends around the engine case wall circumferentially and is connected to N number of injector inlets and is in fluid communication with N number of injectors.

The engine includes a combustor connected to the injector outlet.

The engine case is formed of a nickel alloy.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of testing a fluid dispensing system in an attritable engine that includes a fuel line and an N number of injectors, the method comprising:
   injecting a cooling fluid into a cooling hole for each of (N−1) injectors;
   inducing a first phase change to a flow test fluid in each of the (N−1) injectors, preventing flow through each of the (N−1) injectors; and
   measuring a first flow rate of the flow test fluid through an unblocked injector.

2. The method of claim 1, further comprising:
   injecting the cooling fluid into the unblocked injector;
   inducing a second phase change to the flow test fluid in the unblocked injector, preventing flow through the unblocked injector;
   inducing a third phase change to the flow test fluid in one of the (N−1) injectors, allowing flow through one of the (N−1) injectors; and
   measuring a second flow rate of the flow test fluid through one of the (N−1) injectors.

3. The method of claim 1, wherein the (N−1) injectors are disposed within an engine case wall of the attritable engine and are in fluid communication with a combustion section of the attritable engine.

4. The method of claim 3, wherein the cooling hole is embedded within the engine case wall.

5. The method of claim 4, wherein the cooling hole for each of the (N−1) injectors is in thermal communication with the each of the (N−1) injectors through the engine case wall.

6. The method of claim 3, wherein each of the (N−1) injectors comprises an injector inlet and an injector outlet.

7. The method of claim 6, wherein the fuel line extends circumferentially around the engine case wall and connects to the injector inlet of each of the (N−1) injectors.

8. The method of claim 6, wherein the injector outlet of each of the (N−1) injectors is connected to the combustion section.

* * * * *